United States Patent Office 3,051,636
Patented Aug. 28, 1962

3,051,636
ELECTROLYTIC PREPARATION OF CADMIUM SALTS
Alfred F. Kaspaul, Stamford, Conn., assignor to Minnesota Mining and Manufacturing Company, St. Paul, Minn., a corporation of Delaware
No Drawing. Filed Mar. 30, 1960, Ser. No. 18,499
2 Claims. (Cl. 204—92)

This invention relates to the preparation of certain salts of cadmium, and more particularly to a process for the preparation of cadmium sulfide and cadmium selenide.

Cadmium selenide and cadmium sulfide are materials which are useful in electrical devices such as photocells and the like, and cadmium sulfide is also a valuable yellow pigment.

The preparation of cadmium sulfide and cadmium selenide has heretofore required that a water-soluble salt of cadmium, such as the nitrate, chloride, etc., be prepared as by reacting cadmium metal with the appropriate strong acid as the first step, and this salt must be purified if pure end products are to be obtained. A rather strong or oxidizing acid is required because of the high overvoltage of hydrogen on cadmium. The purified cadmium salt, for example, the cadmium nitrate or chloride or the like, is then dissolved in water, and the solution is treated with hydrogen sulfide or hydrogen selenide. Alkali is added concomitantly with other reactants, to neutralize the acid which is formed in the reaction, and as a result impurities may be introduced. Addition of alkali can be avoided by employing cadmium acetate, which must, however, be prepared indirectly from the nitrate. Such processes are time-consuming, require purification of intermediates, and commonly call for the use of the very toxic gaseous substances hydrogen sulfide and hydrogen selenide.

It is an object of this invention to provide a simple, one-step process for the preparation of cadmium sulfide or selenide, wherein purification of intermediates is not required. It is another object of the invention to provide a process for the preparation of relatively pure fatty acid salts of cadmium. Other objects of the invention will be apparent from the disclosure hereinafter made.

In accordance with the above and other objects, it has been found that cadmium metal can be converted to its sulfide or selenide salt by electrolysis in a weakly acidic aqueous solution, such as 50 volume percent acetic acid, to which an aqueous solution of thioacetamide or selenoacetamide is added, to produce cadmium sulfide or cadmium selenide, respectively, of high purity and in good yield. This process not only reduces the number of steps previously required for producing these salts, but readily provides cadmium sulfide or selenide which is free from inorganic anions and cations which are detrimental for certain end uses, as for example, in photoconductors.

When it is desired to produce fatty acid salts of cadmium, electrolysis is conducted in solutions containing the selected carboxylic acid, for example, carboxylic acids containing from 1 to 8 carbon atoms, such as formic, propionic, valeric, caprylic and the like acids.

The acids which are employed as electrolytes can be used in concentration of from about 5 to about 90% by weight, and preferably are used in concentrations of 25 to 75% by weight of the electrolyte solution. Aqueous solutions are used, except as hereinafter noted.

The electrolysis can be carried out using alternating or direct current. If alternating current is used, both of the electrodes are desirably made of cadmium metal, while if direct current is used, only the anode need be made of cadmium, and the cathode can be made of a suitable inert material such as graphite, platinum or the like.

The substituted acetamide, e.g. thioacetamide or selenoacetamide, which is used is added gradually after electrolysis is started, so that actual evolution of $H_2S$ or $H_2Se$ gases from the electrolysis bath is avoided. The substituted acetamides can be added incrementally as an aqueous solution or as solid material, as desired.

The voltages which are employed in the process of the invention may range from 5 volts to 250 volts, depending upon the size and internal resistance of the apparatus. The current density may vary widely and the current employed can range from about 0.5 to 20 amperes or higher, depending on the size of the electrolytic cell, since the amount of cadmium salt obtained is of course dependent on the number of coulombs of electricity which are used.

The process is carried out at temperatures which range from about 50° C. upward to the boiling point of the electrolyte, that is, of the order of 105° C. to 110° C., the higher temperature generally decreasing the resistance of the electrolytic cell according to well known principles. Heat may be provided by the resistance effect of the cell, or, if desired, particularly in small equipment, external heating may be applied. The process is found to be especially convenient in that no stirring is required owing to the formation of hydrogen during the electrolysis, which, as it is evolved, stirs the solution thoroughly. At the same time, as pointed out above, no external heating is required, as the regulation of current flow will provide sufficient heat to maintain the temperature at the desired point. When the electrolysis has been carried out to the point where the cadmium electrode or the substituted acetamide which is added to the electrolyte has been consumed, the process is interrupted to permit of removing the precipitated cadmium sulfide or cadmium selenide by filtration and replacement or replenishment of the electrodes or electrolyte.

A continuous circulation of electrolyte, with filtration of the precipitate and incremental addition of the substituted acetamide, together with replenishment of the electrodes, can also be employed. For larger scale, continuous operation, the use of banks of electrodes in parallel is particularly desirable, these being connected electrically so that portions can be disconnected and replaced without interruption of the process as a whole.

The cadmium sulfide or selenide product is washed with water and/or pure methanol and carefully dried, whereupon substantially pure cadmium sulfide or selenide is obtained.

The following example will more specifically illustrate the best mode presently contemplated for carrying out the process of the invention.

*Example*

Two rods of pure cadmium metal (99.999% purity) about ½" in diameter and 12" long are suspended in a glass vessel containing a mixture of equal volumes of acetic acid and water. Suspension of the rods is so arranged that the rods are insulated from the respective supports, suitably by rubber-faced clamps, and that the rods are not less than about ½ inch apart at the closest point. (Somewhat greater efficiency can be realized by employing flat faced rods, i.e. having square or rectangular cross-section, with the opposing rods parallel, but this is not critical for successfully practicing the invention.) The insulated rods when immersed in the electrolyte are seen not to be attacked by the weak acid because the overvoltage of hydrogen on cadmium is greater than the half-cell E.M.F. This effect is usually referred to as involving a passivated surface. The rods are then connected to a source of electricity. A variable transformer of a size sufficient to provide about 2–10 amperes is suitable for use with alternating current and connection can be made by spring-actuated clamp or other devices for making electrical connections. Current is turned on and allowed to flow through the solution. Hydrogen gas is evolved rapidly and the electrolyte heats up owing to its internal resistance. Excessive heating may be controlled by decreasing current flow or by external cooling. A 1 molar aqueous solution of thioacetamide is added in small portion during the electrolysis in an amount such that the total thioacetamide added is equal to about ten percent excess over the number of equivalents of cadmium metal dissolved by electrolysis. Since the thioacetamide decomposes more rapidly at higher temperatures with liberation of hydrogen sulfide, it is desirable to control the rate of addition so that it does not greatly exceed the rate of dissolution of cadmium metal. As a practical matter, the reaction is run at the maximum rate possible without evolution of detectible amounts of free $H_2S$. As the cadmium rods dissolve and the added thioacetamide decomposes, cadmium sulfide precipitates as a finely crystalline yellow powder, which is partly maintained in suspension by the evolution of hydrogen gas at the electrodes. The color of the product may vary somewhat from yellow to orange. It is found that a current of 6 amperes at 110 volts A.C. for 80 hours results in substantially complete dissolution of the immersed portions of the cadmium electrodes, whereupon electrolysis is stopped and the cadmium sulfide is removed by filtration. Actually, one of the convenient features of this process is that at this point it is not necessary that all the dissolved cadmium be in the precipitate. Further amounts of thioacetamide can be added to test for complete precipitation. By reusing the electrolyte, adding make-up water as needed, it is thus possible to avoid loss or wastage of either of the reactants. This reuse can be carried on several times before the concentration of acetamide becomes too high.

After completion of the reaction, the pure cadmium sulfide is collected taking necessary precautions to avoid contamination, from dust, lint, etc., washed thoroughly with filtered distilled water and/or methanol and dried with similar precautions. The dry cadmium sulfide is found to be of very high purity, and is suitable for the production of photoconductive devices, such as photoconductive cells for sensing the intensity of light for the purpose of switching artificial illumination off and on as required. Conventional methods are emloyed using the cadmium sulfide prepared as set forth hereinabove for producing such photoconducitve cells.

Substantially identical results with respect to the product are obtained when the process is carried out with the same apparatus, except that direct current is employed, using 0.5 ampere at 30 volts for 60 hours. Only the anode is dissolved, hydrogen being evolved at the cathode.

When selenoacetamide is employed in the process instead of thioacetamide, the product is cadmium selenide of high purity.

In general, acetic acid is the preferred electrolyte for the production of cadmium sulfide or cadmium selenide as described above since it is readily available and inexpensive. Formic acid is rather too strong to permit complete precipitation of the sulfide or selenide. However, when the electrolysis is carried out as above with formic acid, acetic acid, propionic acid, butyric acid or isobutyric acid, but omitting the addition of substituted acetamide, a convenient method is available for formation of the corresponding pure fatty acid salts of cadmium, e.g. cadmium formate, acetate, propionate, butyrate and isobutyrate, respectively, and the like. With the higher alkanoic acids, i.e. those having about 4 to 8 carbon atoms, increased solubility of the acid in water is effected by addition of a solvent such as alcohol, dioxane, tetrahydrofuran or other such solvent which is volatile and evaporates when the salt is recovered by evaporation and crystallization of the electrolyte. Such cadmium salts of aliphatic carboxylic acids having from 1 to 8 carbon atoms are thus obtained in very pure form for use in veterinary medicine, as well as for use as intermediates in chemical syntheses. For example, when hydrogen telluride is passed into a water solution of cadmium propionate, cadmium telluride, which is also of value for making photocells, is precipitated.

What is claimed is:

1. The process for the preparation of a cadmium salt of the group consisting of cadmium sulfide and cadmium selenide, which comprises the steps of subjecting an aqueous solution consisting essentially of acetic acid and a compound of the class consisting of thioacetamide and selenoacetamide to electrolysis with a cadmium anode.

2. The process for the preparation of cadmium salts which comprises electrolysis of an aqueous solution of acetic acid with a cadmium anode while gradually adding after electrolysis has started a compound of the class consisting of thioacetamide and selenoacetamide to the electrolyte solution, and removal of the precipitated cadmium salt.

References Cited in the file of this patent

FOREIGN PATENTS 213,088     Great Britain _____ Mar. 27, 1924